US010670072B2

(12) United States Patent
Noth et al.

(10) Patent No.: US 10,670,072 B2
(45) Date of Patent: Jun. 2, 2020

(54) ROLLING BEARING

(71) Applicant: AKTIEBOLAGET SKF, Gothenburg (SE)

(72) Inventors: Mathias Noth, Wasserlosen (DE); Tristan Kaiser, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 67 days.

(21) Appl. No.: 15/873,735

(22) Filed: Jan. 17, 2018

(65) Prior Publication Data

US 2018/0142730 A1    May 24, 2018

Related U.S. Application Data

(63) Continuation-in-part of application No. 12/738,541, filed as application No. PCT/EP2008/008640 on Oct. 13, 2008, now abandoned.

(30) Foreign Application Priority Data

Oct. 16, 2007    (DE) .................. 10 2007 046 738

(51) Int. Cl.
  *F16C 19/16*    (2006.01)
  *F16C 33/58*    (2006.01)
  *B25D 11/06*    (2006.01)

(52) U.S. Cl.
  CPC ............ *F16C 19/163* (2013.01); *F16C 33/58* (2013.01); *B25D 11/062* (2013.01); *B25D 2250/331* (2013.01); *F16C 2322/50* (2013.01)

(58) Field of Classification Search
  CPC . B25D 11/062; B25D 2250/331; F16C 33/58; F16C 33/581; F16C 33/583; F16C 19/163
  See application file for complete search history.

(56) References Cited

U.S. PATENT DOCUMENTS 3,558,201 A    1/1971  Virtue
4,487,272 A   12/1984  Bleicher et al.
              (Continued)

FOREIGN PATENT DOCUMENTS

DE    3400634 C1    1/1985
DE    3400679 A1    7/1985
              (Continued)

OTHER PUBLICATIONS

Machine Translation of EP 1750010, obtained May 19, 2019.*
(Continued)

*Primary Examiner* — Richard W Ridley
*Assistant Examiner* — Brian J McGovern
(74) *Attorney, Agent, or Firm* — MH2 Technology Law Group LLP

(57)    ABSTRACT

A roller bearing for at least one set of roller bodies, which are disposed in an annular manner, the roller bearing having at least one track element with a track, on which the roller bodies are provided for rolling. The track comprises a track base having a circular circumferential line. The track element comprises, on each axial side of the track base, a shoulder or a rim for the roller bodies, each shoulder or rim having a circular circumferential line. The track element is formed such that, as viewed perpendicular to the planes defined by the circumferential lines, all center points of the three circumferential lines are different from each other.

20 Claims, 4 Drawing Sheets

(56) References Cited

U.S. PATENT DOCUMENTS

| | | | |
|---|---|---|---|
| 4,603,923 A | | 8/1986 | Doppling et al. |
| 5,435,397 A | * | 7/1995 | Demuth ............... B25D 11/005 173/109 |
| 7,404,451 B2 | | 7/2008 | Neumann |

FOREIGN PATENT DOCUMENTS

| | | |
|---|---|---|
| EP | 1716980 A1 | 11/2006 |
| EP | 1750010 A1 | 2/2007 |
| FR | 2557937 A | 7/1985 |

OTHER PUBLICATIONS

"Friction Welding," Wikipedia page retrieved from Wayback Machine archived on Feb. 1, 2008, url: <https://web.archive.org/web/20080201144648/http://en.wikipedia.org:80/wiki/Friction_welding>.*

* cited by examiner

ROLLING BEARING

CROSS-REFERENCE TO RELATED APPLICATIONS

This application is a continuation-in-part of U.S. patent application Ser. No. 12/738,541, filed on Aug. 17, 2010, which is a national-stage entry of PCT Patent Application No. PCT/EP08/08640, filed on Oct. 13, 2008, which claims priority to German Patent Application No. 102007046738.7, filed on Oct. 16, 2007. Each of these applications is incorporated herein by reference in its entirety.

BACKGROUND

The invention relates to a roller bearing for at least one set of roller bodies, which are disposed in an annular manner, the roller bearing having at least one track element with a track, on which the roller bodies are provided to roll.

Ball bearing assemblies for wobble gearing is known. In conventional designs, a grooved ball bearing is utilized, in which only the bore of the bearing inner ring is formed in an inclined manner relative to an outer surface of the ball bearing inner ring.

SUMMARY

Embodiments of the present disclosure may provide an improved roller bearing. For example, the present disclosure may provide a roller bearing for at least one set of roller bodies, which are disposed in an annular manner, the roller bearing having at least one track element with a track, on which the roller bodies are provided for rolling, includes the following features. The track comprises a track base having a circular circumferential line, the track element comprises, on each axial side of the track base, a shoulder or a rim for the roller bodies, each shoulder or rim having a circular circumferential line, and/or the track element is formed such that, as viewed perpendicular to the planes defined by the circumferential lines, all center points of the three circumferential lines are different from each other.

In a ball bearing arrangement for the typical case of a wobble gear, wherein a force is to be transferred in the axial direction, in particular, at one circumferential point of the outer ring of the ball bearing arrangement, the design of the two track elements with a track base and shoulders being concentric to each other is suboptimal, because the application of force on the shoulder portions, in particular, is quite variable depending on the rotational position of the ball bearing arrangement, with reference to said force transfer point. According to the invention, this is now overcome in that the track element is designed such that all center points of the three circumferential lines are different from each other, as viewed perpendicular to the planes defined by the circumferential lines of the track base and the shoulders and/or the rim, i.e., the circumferential lines are, so to speak, eccentric to each other. With the present invention, not only slightly-improved, but significantly longer lifetimes of the roller bearing can be achieved for comparable installation space utilization and comparable load situations like in the state of the art, which amounts to a quantum leap in the roller bearing field.

Further advantages, features and details of the invention result from the exemplary embodiment of the invention described in the following with the assistance of the Figures.

DETAILED DESCRIPTION

Figure 1:
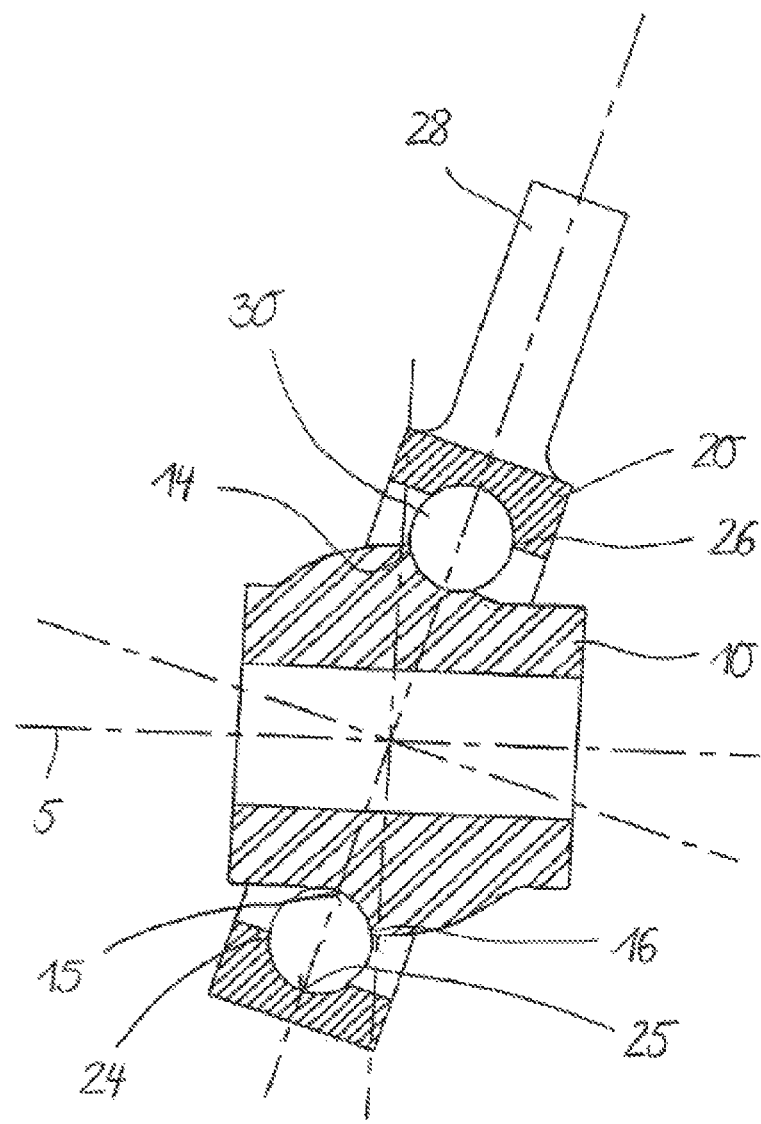
FIG. 1 illustrates a longitudinal section through a roller bearing according to an embodiment.

As an exemplary embodiment of the invention, FIG. 1 shows a longitudinal section through a roller bearing according to the invention. The roller bearing comprises an inner track element 10 and an outer track element 20, between which are disposed a set of roller bodies that are formed as balls 30 and are disposed in an annular manner, wherein the balls 30 can be disposed in a not-illustrated cage. The inner track element 10 is formed such that, in one rotation of the inner track element about the rotational axis 5, the plane defined by a circumferential line of a track base 15 for the balls 30 performs a rocking motion about said rotational axis 5.

This rocking motion is correspondingly transferred to the outer track element 20. A pin (or "extension") 28 is disposed at a circumferential point on the outer surface of the outer track element 20 by friction welding, with which the reciprocation of the pin 28 in the direction of the rotational axis 5 caused by said rocking motion is transferred to another structural element, e.g., in the context of a hammer drill or a chisel hammer. By friction welding the pin 28 onto the outer surface of the outer track element 20 (e.g., at least one circumferential portion of the outer track element 20), expensive manufacturing methods, for example cutting out the pin 28, are advantageously avoided.

Both track elements 10 and 20 are formed with a track base 15 and 25 for the balls 30 and with shoulders 14 and 16 as well as 24 and 26 disposed on both sides of the track base 15 and 25. For each track element 10 and 20, the circular circumferential lines of the track base 15 and 25 as well as the two shoulders 14, 16 and 24, 26, respectively, all center points of the three circumferential lines are different from each other as viewed perpendicular to the parallel-to-each-other planes defined by the circumferential lines. As a result, in particular, the forces in the axial direction occurring during the rocking motion are absorbed and transferred by an always sufficiently-high dimensioned shoulder portion of the track elements 10 and 20.

In FIG. 1, a maximal inclination of the track base 15 of the inner track element 10 is illustrated. The two shoulders 14 and 16 of the inner track element 10 are formed such that their circumferential lines reach this maximal inclination earlier or later, e.g., by 10° in an advanced or lagging manner, wherein this depends on the particular operating conditions of the roller bearing. In other embodiments, the advancing or lagging can also be greater or less than 10° or the track elements can also be formed such that the track base and the shoulders reach said maximal inclination at the same time. It is important, however, that the force demand profile, which is predetermined by the installation environment and the intended usage, is dependent on the rotational position of the roller bearing.

The outer track element 20 is constructed in a manner corresponding to the inner. For the outer track element 20, the particulars of the advancing and lagging of the shoulders 24 and 26, which was previously described for the inner track element 10, can be described in a more simple manner in that the center points of the circumferential lines of both shoulders 24 and 26 lie offset relative to a straight line that extends through the center point of the circumferential line of the track base 25 of the outer track element 20 and the connection point of the pin 28.

In one embodiment, the track elements 10 and 20 are, in particular, made of a case-hardened steel having a relatively high nickel content. In other embodiments, the inner track element 10 can also be formed, e.g., in two pieces, in that the track base 15 and the shoulder 14 and 16 are formed similar to the outer track element 20 and it is then installed in an appropriate manner in a second piece.

Summarized in a catch phrase manner, one can also describe the above-described roller bearing as a three-point-optimized wobble bearing.

Figure 2:
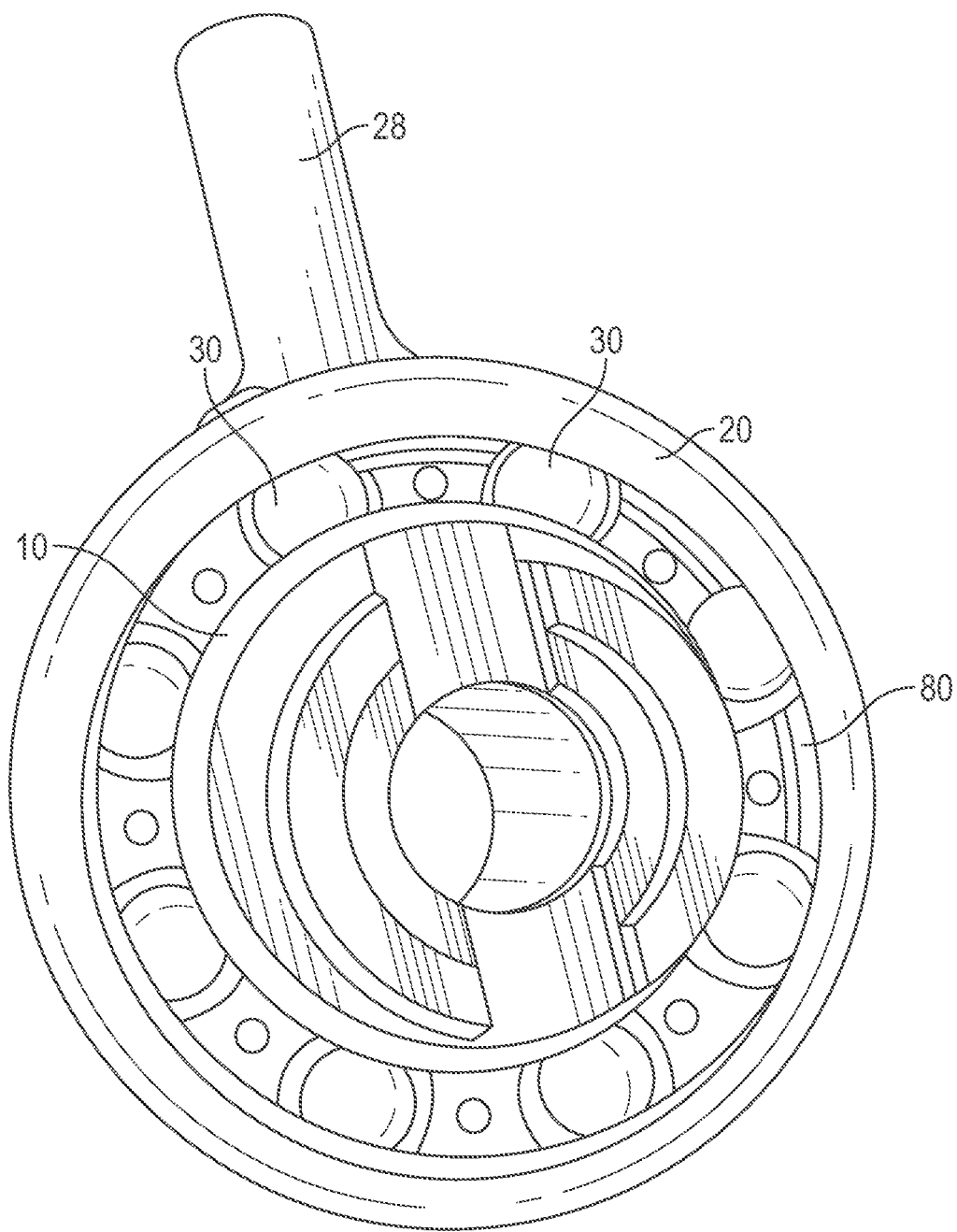
FIG. 2 illustrates an end view of the roller bearing, according to an embodiment.

FIG. 2 illustrates an end view of the bearing assembly, according to an embodiment. As shown, the bearing assembly includes the inner and outer track elements 10, 20, along with the rollers 30 therebetween, which allow the relative rotation between the track elements 10, 20. Furthermore, a cage 80 is provided between the balls 30, as mentioned above. As the inner and outer track elements 10, 20 rotate relative to one another, the pin 28 is displaced axially, e.g., to produce an intermittent engagement (hammering) with another structure.

Figure 3:
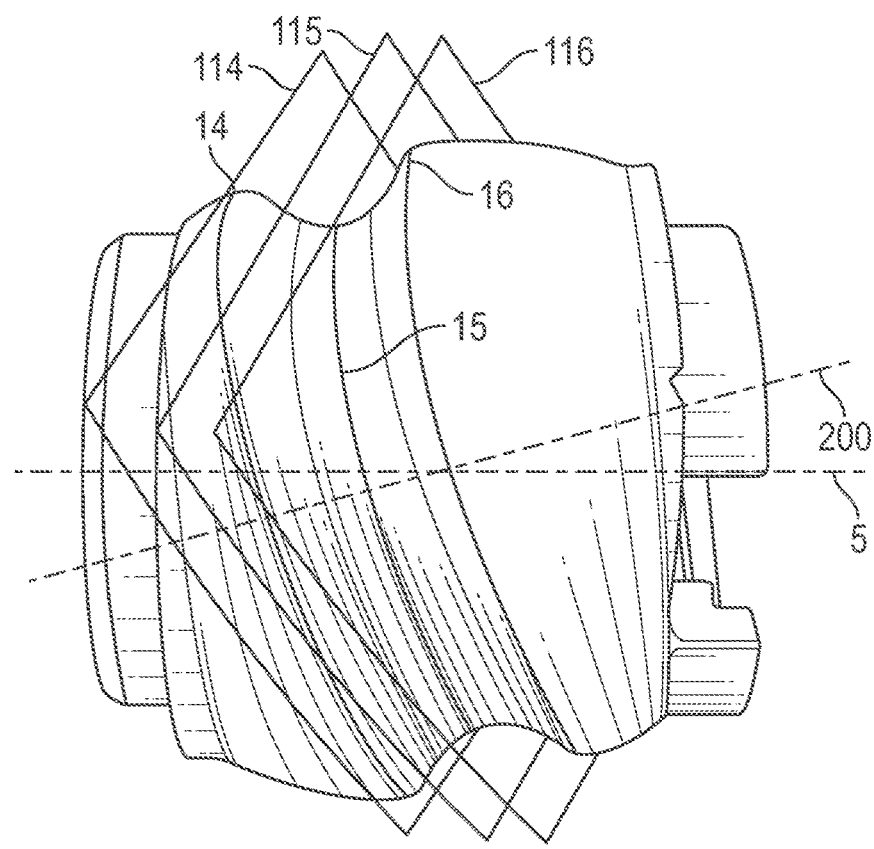
FIG. 3 illustrates a side view of an inner track element of the roller bearing, according to an embodiment.
Figure 4:
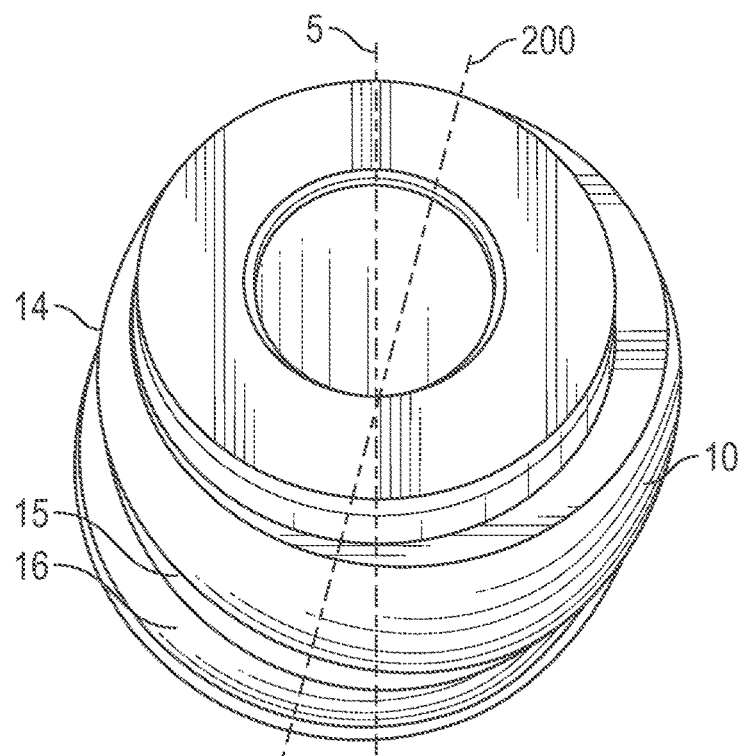
FIG. 4 illustrates a raised perspective view of the inner track element, according to an embodiment.

FIGS. 3 and 4 illustrates a side view and a perspective view, respectively, of the inner track element 10. As shown, but as one of ordinary skill in the art would appreciate from FIG. 1, the shoulders 14, 16 and track base 15 define circumferential lines, which are each positioned in (and thus define) a plane 114, 115, 116. The planes 114, 115, 116 are parallel to one another, and the line 200 is normal to the planes 114, 115, 116. Note, the rotational axis 5 is not collinear with the line 200.

The shoulders 14, 16, and track base 15 are each point symmetric about their respective centers; however, at least two of these centers are not positioned along the line 200, or any other line that is perpendicular to the three planes 114, 115, 116. Thus, despite the planes 114, 115, 116 in which the shoulders 14, 16 and the track base 15 are positioned, being parallel, the points are offset both axially and laterally from one another, as viewed along the line 200, or any other line that is perpendicular to the planes 114, 115, 116. This can be appreciated by referring additionally to FIG. 3, in which it can be seen that the shoulders 14, 16 and the track base 15 therebetween are offset from one another (i.e., left and right in FIG. 4, which is into/out of the page in FIG. 3). In particular, the shoulders 14, 16 may be offset laterally (e.g., to the right, as shown in FIG. 4) with respect to the track base 15; however, the shoulder 14 is offset from the track base 15 to the right to a greater distance than is the shoulder 16, i.e., the shoulders 14, 16 may be offset by different distances, resulting in the centers of the shoulders 14, 16 being offset from one another, in addition to being offset from the center of the track base 15. It will be appreciated that the direction in which the shoulders 14, 16 is offset may or may not be the same, that is, the shoulders 14, 16 may be offset from the track base 15 in slightly different directions.

Figure 5:
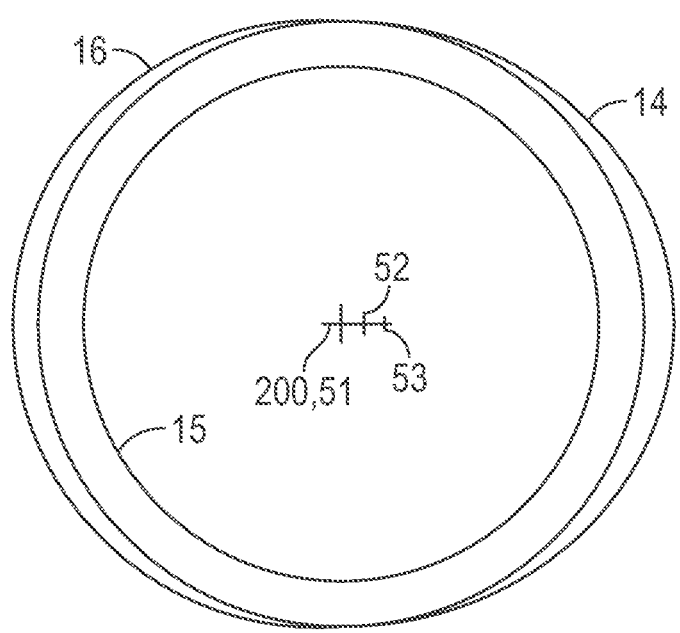
FIG. 5 illustrates a conceptual view of the geometry of the inner track element, according to an embodiment.

FIG. 5 illustrates a conceptual view of the circular lines defined by the shoulders 14, 16, and the track base 15, viewed along line 200, according to one potential embodiment among many contemplated. The track base 15 defines a center 51, and the shoulders 14, 16 define the centers 53, 52, respectively. As shown, the shoulders 14, 16 are shifted to the right by different distances with respect to the track base 15. Accordingly, when viewed along the line 200, considering the line 200 extending perpendicular to the circular lines of the shoulders 14, 16, and the track base 15, the line 200 intersects the center 51 of the track base 15, but does not intersect either of the centers 53, 52 of the shoulders 14, 16. Indeed, no line can be drawn perpendicular to the circular lines defined by the shoulders 14, 16 and the track base 15 (i.e., perpendicular to the page) that intersects any two of the centers 51, 52, 53. Furthermore, as can be seen, the circular lines (and thus the track base 15 and shoulders 14, 16 that they represent) may be point symmetric about their respective centers 51, 52, 53.

Another way to consider this geometry is to consider the centers of the track base 15 and the centers of the shoulders 14, 16 projected into a single plane (e.g., as shown in FIG. 5, as viewed perpendicular to the parallel-to-each-other planes 114, 115, 116) with a polar coordinate system applied. The center 51 of the track base 15 is the pole. Accordingly, polar coordinates for the centers 53, 52 of the shoulders 14, 16 would be different. Both would have non-zero radii, but not necessarily the same radii. Further, both would have angles, which may or may not be the same. If the angles are the same, the radii would be different, and vice versa. Again, however, this is merely for describing the lateral offset of the centers, as it will be appreciated that the centers of the shoulders 14, 16 would also be axially offset from the track base 15 to allow for the axial dimension of the groove (track) in which the balls 30 roll.

What is claimed is:

1. A roller bearing for at least one set of roller bodies, which are disposed in an annular manner, the roller bearing having an inner track element and an outer track element, between which the at least one set of roller bodies are provided for rolling, wherein:

the inner track element comprises:
an inner track base having an inner track circumference that is in an inner track plane,
a first inner shoulder on a first axial side of the inner track base, wherein the first inner shoulder has a first inner shoulder circumference that is in a first inner shoulder plane; and
a second inner shoulder on a second axial side of the inner track base, wherein the second inner shoulder has a second inner shoulder circumference that is in a second inner shoulder plane;

the inner track element is formed such that, as viewed perpendicular to the inner track plane, the first inner shoulder plane, and the second inner shoulder plane, a center point of the inner track circumference, a center point of the first inner shoulder circumference, and a center point of the second inner shoulder circumference are different from each other;

the inner track element is provided to rotate about a rotational axis, wherein a first distance between the rotational axis and the first inner shoulder is different than a second distance between the rotational axis and the second inner shoulder, and wherein the first and second distances are perpendicular to the rotational axis;

the outer track element comprises:
an outer track base having an outer track circumference that is in an outer track plane,
a first outer shoulder on a first axial side of the outer track base, wherein the first outer shoulder has a first outer shoulder circumference that is in a first outer shoulder plane; and
a second outer shoulder on a second axial side of the outer track base, wherein the second outer shoulder has a second outer shoulder circumference that is in a second outer shoulder plane;

the outer track element is formed such that, as viewed perpendicular to the outer track plane, the first outer shoulder plane, and the second outer shoulder plane, a center point of the outer track circumference, a center point of the first outer shoulder circumference, and a center point of the second outer shoulder circumference are different from each other; and the first outer shoulder circumference and the second outer shoulder circumference are substantially the same size.

2. A roller bearing according to claim 1, wherein the rotational axis has an inclination relative to the inner track plane, the first inner shoulder plane, and the second inner shoulder plane so that the inner track plane is provided for performing a rocking motion relative to the rotational axis.

3. A roller bearing according to claim 2, wherein the rocking motion of the inner track plane is characterized, when laterally viewing the rotational axis, by two end positions having a maximal inclination relative to the rotational axis, and the inner track element is formed such that two end positions of the first inner shoulder plane and two end positions of the second inner shoulder plane are reached in an advanced or lagging manner by a predetermined angle as compared to the two end positions of the inner track plane.

4. A roller bearing according to claim 3, wherein the two end positions of the first inner shoulder plane and the two end positions of the second inner shoulder plane are different from each other.

5. A roller bearing according to claim 4, wherein the center points of the first inner shoulder circumference and the second inner shoulder circumference are disposed in a point symmetric manner relative to the center point of the inner track circumference.

6. A roller bearing according to claim 5, wherein the roller bearing comprises the inner track element and the outer track element, between which the at least one set of roller bodies is disposed, and the inner and outer track elements are formed in a manner corresponding to each other.

7. A roller bearing according to claim 6, wherein at least one circumferential portion of one of the inner and outer track elements is provided to transfer a force onto at least one additional structural element.

8. A roller bearing according to claim 7, wherein one of the inner and outer track elements comprises an extension in said at least one circumferential portion.

9. A roller bearing according to claim 8, wherein the extension is attached by friction welding.

10. A roller bearing according to claim 9, wherein the center points of the first inner shoulder circumference and the second inner shoulder circumference lie offset relative to a straight line that extends through the center point of the inner track circumference.

11. A roller bearing according to claim 1, wherein the first and second distances are taken at a same circumferential position.

12. A roller bearing comprising:
an inner track element including:
an inner track base having an inner track circumference that is in an inner track plane;
a first inner shoulder disposed on a first side of the inner track base as viewed in an axial direction of the roller bearing, the first inner shoulder having a first inner shoulder circumference that is in a first inner shoulder plane; and
a second inner shoulder disposed on a second side of the inner track base as viewed in the axial direction, the second inner shoulder having a second inner shoulder circumference that is in a second inner shoulder plane;
an outer track element including:
an outer track base having an outer track circumference that is in an outer track plane,
a first outer shoulder on a first axial side of the outer track base, wherein the first outer shoulder has a first outer shoulder circumference that is in a first outer shoulder plane; and
a second outer shoulder on a second axial side of the outer track base, wherein the second outer shoulder has a second outer shoulder circumference that is in a second outer shoulder plane; and
at least one set of roller bodies disposed in an annular manner around the inner track base,
wherein the inner track base, first inner shoulder, and second inner shoulder are configured such that, as viewed perpendicular to the inner track plane, the first inner shoulder plane, and the second inner shoulder plane, a center point of the inner track circumference, a center point of the first inner shoulder circumference, and a center point of the second inner shoulder circumference do not overlap,
wherein the inner track element is provided to rotate about a rotational axis,
wherein a first distance between the rotational axis and the first inner shoulder is different than a second distance between the rotational axis and the second inner shoulder,
wherein the first and second distances are perpendicular to the rotational axis,
wherein the outer track base, the first outer shoulder, and the second outer shoulder are configured such that, as viewed perpendicular to the outer track plane, the first outer shoulder plane, and the second outer shoulder plane, a center point of the outer track circumference, a center point of the first outer shoulder circumference, and a center point of the second outer shoulder circumference are different from each other, and
wherein the first outer shoulder circumference and the second outer shoulder circumference are substantially the same size.

13. A roller bearing according to claim 12, wherein the rotational axis is oblique relative to the inner track plane, the first inner shoulder plane, and the second inner shoulder plane so that the inner track plane performs a rocking motion relative to the rotational axis during each revolution of the inner track element.

14. A roller bearing according to claim 13, wherein the rocking motion of the inner track plane is bounded, when viewed laterally to the rotational axis, by two end positions having a maximal inclination relative to the rotational axis, and the inner track element is formed such that two end positions of the first inner shoulder plane and two end positions of the second inner shoulder plane are reached in an advanced or lagging manner by a predetermined angle as compared to the two end positions of the inner track plane.

15. A roller bearing according to claim 14, wherein the two end positions of the first inner shoulder plane and the two end positions of the second inner shoulder plane are difference from each other.

16. A roller bearing according to claim 12, wherein the center points of the first inner shoulder circumference and the second inner shoulder circumference are disposed in a point symmetric manner relative to the center point of the inner track circumference.

17. A roller bearing according to claim 12, wherein the roller bearing comprises the inner track element and the outer track element, between which the at least one set of roller bodies is disposed, and the inner and outer track elements are formed in a manner complementary to each other.

18. A roller bearing according to claim 17, further comprising an extension projecting from a circumferential portion of one of the inner and outer track elements, the extension being configured to transfer a reciprocating force to at least one additional structural element.

19. A roller bearing according to claim 18, wherein the first inner shoulder circumference and the second inner shoulder circumference lie offset relative to a straight line that extends through the center point of the inner track circumference.

20. A roller bearing according to claim 19, wherein the center points of the first inner shoulder circumference and the second inner shoulder circumference are disposed in a point symmetric manner relative to the center point of the inner track circumference.

* * * * *